Jan. 29, 1963 A. I. BENNETT, JR., ET AL 3,076,134
CONTROL APPARATUS
Filed April 7, 1960 4 Sheets-Sheet 1

WITNESSES
John E. Healy, Jr.
James F. Young

INVENTORS
Allan I. Bennett, Jr. &
Richard L. Longini
BY
Ernest P. Klipfel
ATTORNEY

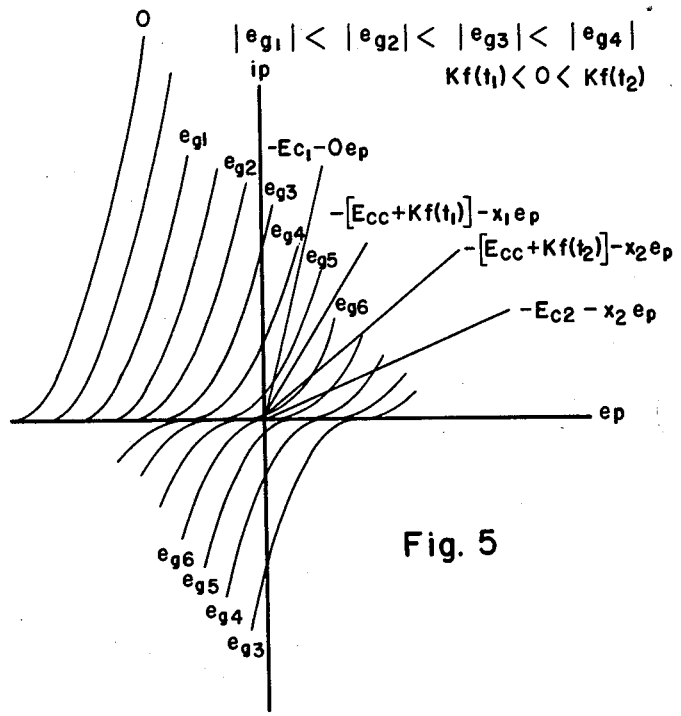
Fig. 5
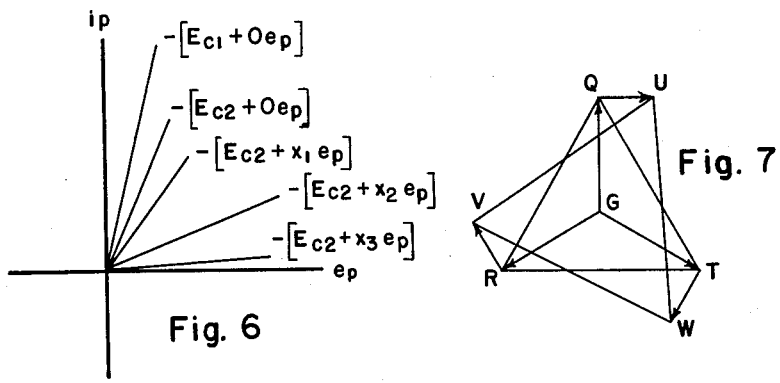
Fig. 6
Fig. 7

United States Patent Office 3,076,134
Patented Jan. 29, 1963

3,076,134
CONTROL APPARATUS
Allan I. Bennett, Jr., Franklin Township, Westmoreland County, and Richard L. Longini, Pittsburgh, Pa., assignors to Westinghouse Electric Corporation, East Pittsburgh, Pa., a corporation of Pennsylvania
Filed Apr. 7, 1960, Ser. No. 22,076
5 Claims. (Cl. 322—20)

The invention relates generally to control apparatus and more particularly to regulating system for controlling the output of controlled rectifier apparatus in response to the deviation of a process variable from a desired value.

In many applications it is necessary to maintain a predetermined quantity substantially constant. For instance, in temperature control applications it is necessary to maintain the actual load temperature equal, as nearly as possible, to a desired temperature which may vary with time, in the presence of external disturbances such as line voltage fluctuations and changes in nature of the load or its surroundings.

The output of a controlled rectifier system is controlled by an excitation voltage system which varies with the error or deviation signal. In many such excitation systems when there is a deviation of actual temperature from desired temperature, a time delay between error and correction results due to the mechanical inertia of the system. When using a self-balancing potentiometer the small error voltage, resulting from minor variations of temperature from the desired level, is bucked against a variable voltage derived from a motor-positioned slidewire. Such a system provides no corrective action until the shaft position of the slidewire has been changed. It is readily apparent that a certain finite error is required to cause a slidewire motor voltage large enough to overcome the static friction of the device and that no corrective action is ever taken for errors smaller than the minimum required to overcome the inertia of the moving parts.

The present invention provides an excitation control system wherein no moving parts are employed. The control system operates by generating a modulated sinusoidal voltage or set of such voltages, such that if a temperature error voltage is $f(t)$ the modulated voltage is $f(t) \sin \omega t$, or a system of such voltages. The modulated voltage system is then added to another fixed voltage system in such a manner that the sum is a voltage system whose phase is determined by $f(t)$. This sum is then directly applied to the control elements of the rectifier apparatus without the intermediate use of any mechanical moving parts.

Accordingly, an object of the present invention is to provide an excitation voltage system utilizing static components.

More specifically, an object of the present invention is to provide a regulated excitation voltage system wherein no moving parts are employed whose position or motion is governed by the deviation signal of actual to desired conditions.

Another object of the present invention is to provide a regulating system wherein a symmetrical waveform is modulated by a deviation signal, which modulated waveform is then added to another fixed voltage system with the summation having a phase displacement determined by the error signal and whose magnitude is substantially constant.

Further objects and advantages will be readily apparent from the following detailed description taken in conjunction with the drawing, in which:

FIG. 5 is a graphical analysis of certain components shown in FIG. 4 wherein the characteristics are plotted in fashion identical to that conventionally used in analysis of push-pull amplifiers;

FIG. 6 is a graphical representation of a selection process by which the optimum operational response of the present invention is attained;

FIG. 7 is a vector diagram illustrating the manner in which the invention obtains the desired results in a three-phase excitation system;

Figure 1:
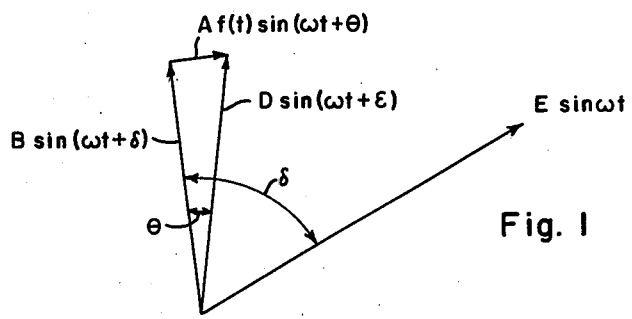
FIGURE 1 is a vector diagram illustrating the manner in which the invention obtains the desired results.

For purposes of clarity, the vector diagram of a single phase excitation system for a controlled rectifier scheme has been illustrated in FIG. 1. A line voltage of form $E \sin \omega t$ supplies alternating power to the rectifier. A firing voltage of form $B \sin (\omega t + \delta)$ is assumed already applied to the rectifier grids, with phase so chosen as to make the rectifier output any convenient reference level thereby establishing a desired temperature level. This firing voltage will be of fixed amplitude and phase and the frequency will be the same as the frequency of the line voltage. The same frequency is also chosen for a quadrature voltage $Af(t) \sin (\omega t + \phi)$ with the phase angle $\phi$ chosen so that quadrature voltage $Af(t) \sin (\omega t + \phi)$ and $B \sin (\omega t + \delta)$ are substantially 90° apart in phase. In other words the voltages are chosen such that $\delta - \phi$ equals substantially $\pi/2$ radians when angles are expressed in radians. From the vector diagram of FIGURE 1 it can be seen that when the sinusoidal firing voltage $B \sin (\omega t + \delta)$ is replaced by the vectorial sum of the sinusoidal firing voltage and the quadrature voltage, and the magnitude $Af(t)$ is held small compared to the magnitude $B$, the vectorial sum is a phase modulated sine wave of nearly constant amplitude and whose phase depends on $f(t)$, lagging or leading that of $B \sin (\omega t + \delta)$ depending upon whether the error signal $f(t)$ is positive or negative. It is evident that adding the small sinusoidal voltage $AF(t) \sin (\omega t + \phi)$ to the larger sinusoidal voltage $B \sin (\omega t + \delta)$ results in a sinusoidal sum herein designated as $D \sin (\omega t + \epsilon)$ in which:

$$D = (B^2 + A^2 f(t)^2)^{\frac{1}{2}}$$

and $$\epsilon = \delta - \tan^{-1} \frac{Af(t)}{B}$$

Thus it can be seen that the amplitude $D$ is substantially equal to the amplitude $B$. The phase of the voltage $D \sin (\omega t + \epsilon)$ is different from that of the voltage $B \sin (\omega t + \delta)$ by an amount $\theta$ which is nearly proportional to $f(t)$; specifically, $\theta = \tan^{-1} Af(t)/B$. It is evident that $\theta$ has the same sign as $f(t)$. Therefore, the phase $\epsilon$ of the excitation voltage to the controlled rectifier is varied about the reference phase angle $\delta$ of the voltage $B \sin (\omega t + \delta)$ in accordance with the error signal $f(t)$.

If the load temperature exceeds the desired temperature, a positive error signal $f(t)$ will be produced causing the phase of the rectifier excitation firing voltage to lag that of $B \sin (\omega t + \delta)$ by an amount $\theta$, thus reducing the power to the load and correcting the temperature error. An opposite action occurs if the load temperature is too low, again resulting in correction of the error.

Figure 2:
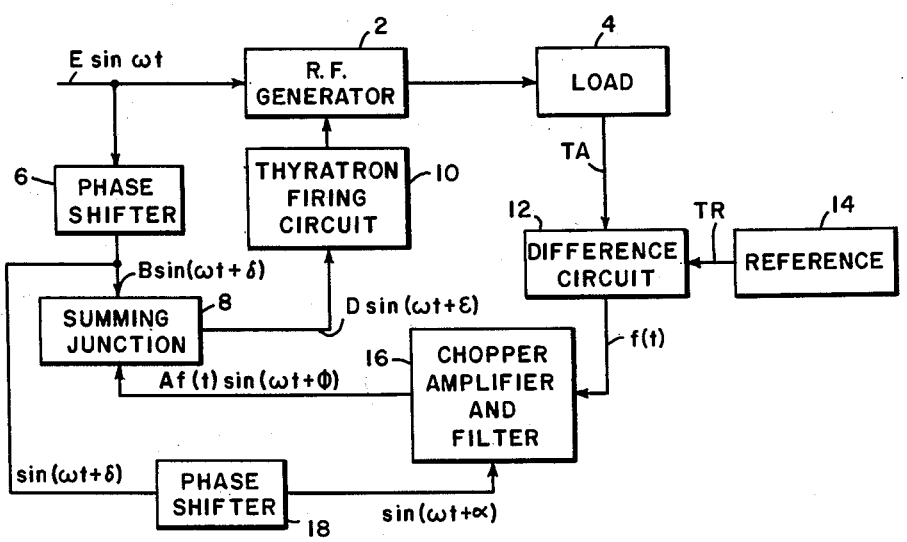
FIG. 2 is a block diagram of a temperature control system embodying the teachings of the invention.

The block diagram of FIGURE 2 illustrates a single phase grid controlled rectifier responsive to a direct current electrical control signal of small magnitude. Specifically, the block diagram illustrates the temperature control of a thyratron controlled radio frequency induction power generator 2 providing a regulated output to a load 4, from the alternating current power line having a waveform $E \sin(\omega t)$.

A first phase shifter 6 provides a sinusoidal firing voltage of form $B \sin(\omega t + \delta)$ to a summing junction 8. The summing junction 8 in turn provides an excitation or firing voltage to a firing circuit 10 in accordance with the inputs received by the junction 8.

As the actual temperature of the load 4 varies from the desired level a thermocouple or other suitable device (not illustrated) provides a signal TA to a difference circuit 12 wherein it is compared to a reference signal TR provided by reference circuit 14. The resultant output from the difference circuit 12 is the error voltage $f(t)$ which is in turn connected to a chopper amplifier and filter circuit 16.

At the same time a second phase shifter 18 provides a driving voltage to the chopper amplifier 16 having a waveform $\sin(\omega t + \alpha)$. Of course, any suitable periodic waveform may be used. The chopper amplifier and filter circuit 16 converts the input direct current voltage $f(t)$ to an alternating signal, amplifies this signal by an effective gain designated as "a" and filters out the harmonics so that the output from the chopper amplifier and filter circuit 16 is a voltage of form $Af(t) \sin(\omega t + \phi)$. When desirable the phase shifter 18 may be combined in the chopper amplifier 16 in such a manner that the phase angle $\phi$ may be controlled by proper choice of the operating time of the chopper contacts. In either case the phase angles are chosen such that $\delta - \phi$ substantially equals 90° so that a quadrature vector addition can be accomplished in the summing junction 8.

It is convenient to set the first phase shifter 6 so that the sinusoidal firing voltage $B \sin(\omega t + \delta)$ if applied alone to the firing circuit 10 is proper to maintain the load temperature at the desired value. Assuming the phase shifter 6 has been so set, if the temperature of the load 4 is at its desired reference value then the error signal $f(t)$ will be equal to zero and the resultant input $$Af(t) \sin(\omega t + \phi)$$

to the summing junction 8 will be zero. In this case the sinusoidal firing voltage $B \sin(\omega t + \delta)$ will be unaltered in form to the firing control circuit 10 so that the power will be proper to maintain the load 4 at the desired temperature. However, should an error signal $f(t)$ be present then the resultant excitation voltage to the firing control circuit 10 will be $D \sin(\omega t + \epsilon)$ as previously described with reference to FIGURE 1, thus changing the power to the load 4 to reduce the temperature error.

Figure 3:
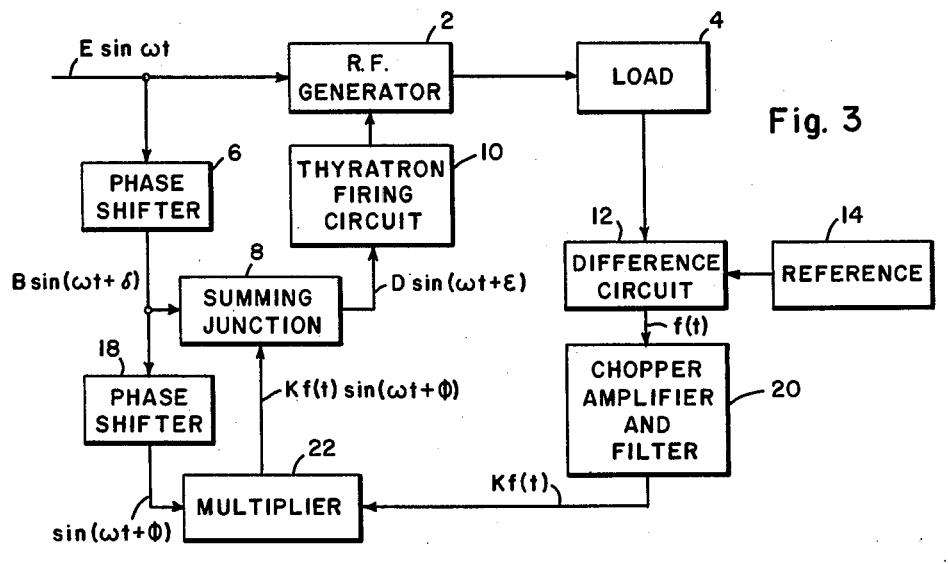
FIG. 3 is a block diagram of another illustrative embodiment of the invention.

An alternate embodiment is shown in FIGURE 3 wherein for the purposes of clarity all like components have been given similar reference characters to those used in FIGURE 2. It can be seen that a chopper amplifier 20 is chosen to be a direct current amplifier capable of amplifying the error signal $f(t)$ by a constant "K." The amplified error signal $Kf(t)$ is multiplied with the quadrature waveform $\sin(\omega t + \phi)$ in a multiplier 22 with a resultant output $Kf(t) \sin(\omega t + \phi)$ to the summing junction 8.

Figure 4:
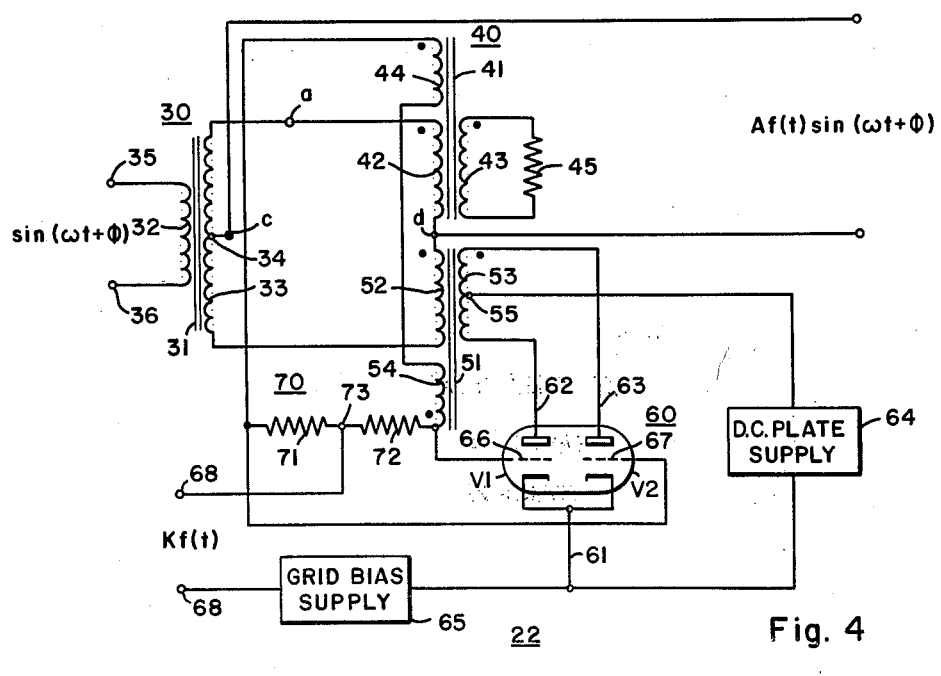
FIG. 4 is an electrical schematic diagram of a component shown in FIG. 3.

Referring to FIG. 4, the multiplier 22 comprises generally an input circuit 30, a first transformer circuit 40, a second transformer circuit 50, an electrically controlled resistance circuit 60, and a feedback circuit 70.

The input circuit 30 comprises a core member 31 having wound thereon a primary winding 32 and a center-tapped secondary winding 33. The center tap connection on the secondary winding 33 has been indicated at 34. Terminals for the primary winding 32 have been indicated at 35 and 36.

The first transformer circuit 40 comprises a core member 41 having wound thereon a primary winding 42, a secondary winding 43 and a feedback winding 44. A resistive element 45 is connected across the secondary winding 43.

The second transformer circuit 50 comprises a core member 51 having wound thereon a primary winding 52, a center-tapped secondary winding 53, and a feedback winding 54. The center tap connection on the secondary winding 53 has been indicated at 55.

The multiplier 22 of FIGURE 3 is schematically shown in FIG. 4 as a bridge modulator having input terminals $a$, $b$ and output terminals $c$, $d$. The end terminals of the center tapped secondary winding 33 are connected to the input terminals $a$, $b$, respectively as is one end of the primary winding 42 and one end of the primary winding 52. The opposite ends of each primary windings 42 and 52 are connected together at the output terminal $d$. The center tap connection 34 is connected directly to the output terminal $c$. The multiplier 22, therefore, is a bridge arrangement wherein two adjacent legs are the two halves of the secondary winding 33. The third leg of the bridge circuit is the impedance 45 reflected through the first transformer circuit 40 to the primary winding 42 connected between the terminals, $a$, $d$. The resistance of the fourth leg of the bridge circuit is the resistance provided by the electrically controlled resistance circuit 60 reflected to the primary winding 52 connected across the terminals $b$, $d$.

It can be shown that by varying the impedance of one of the legs of the bridge, specifically between terminals $b$ and $d$, with the error voltage $f(t)$ and adjusting the other legs so that the bridge is approximately balanced, that the voltage across the output terminals $c$, $d$ will have an amplitude which varies with the error signal $f(t)$. The output amplitude will be zero when $f(t)$ is zero.

The electrically controlled resistance circuit 60 is adapted to vary the impedance of the leg between terminals $b$ and $d$ and comprises triodes V1 and V2 having a common cathode 61 and anodes 62 and 63. A direct current plate supply 64 is connected across the anode-cathode circuit of the tubes V1, V2 by means of the center tapped secondary winding 53. The direct current potential source 65 provides grid bias supply to the grids 66 and 67 of the tubes V1, V2 respectively. Connected in series with the grid bias supply 65 are the input terminals 68 adapted to receive the amplified error signal $Kf(t)$ from the chopper amplifier 20 (FIGURE 3).

The feedback circuit 70 comprises the feedback winding 44 mounted on the core 41 and the feedback winding 54 mounted on the core 51 and serially connected together in a loop fashion with resistors 71 and 72. Resistors 71 and 72 are chosen to be of equivalent impedance values. One of the input terminals 68 is connected to the junction 73 of the resistors 71 and 72. The opposite end of each resistor 71, 72 is connected to a grid 66, 67 respectively.

The impedance across the terminals $b$, $d$ is the plate resistance of the triodes V1 and V2 reflected through the core member 51 to the primary winding 52 connected across the terminal $b$, $d$. The plate resistance of the tubes V1 and V2 and hence the reflected resistance between terminals $b$ and $d$ can be controlled by varying the bias on the grids 66, 67 of these tubes. When the reflected resistance is such as to balance the bridge, no output between the terminals $c$, $d$ will occur.

The amplified error voltage $Kf(t)$, in series with a suitable fixed direct current grid bias supply 65, is applied between the grids and common cathodes. Variation of $f(t)$ varies the effective plate resistance of the triodes and hence the alternating current resistance observed across the terminal $b$, $d$. As the impedance across the terminals $b$, $d$ varies so will the output voltage across the output terminals $c$, $d$ vary as $Af(t) \sin(\omega t + \phi)$.

It is desirable that the bridge output voltage $Af(t) \sin(\alpha t + \phi)$ be as nearly sinusoidal as possible. This condition is most readily met by applying to the grids of the tubes V1 and V2 an alternating current voltage by means of the feedback circuit 70 in addition to the direct current voltage $Kf(t)$ and the grid bias supply 65. The alternating current voltage supplied by the feedback circuit 70 is center tapped by means of the resistors 71, 72 and applied in opposition to the two grids 66 and 67. By this connection, the resistance of the leg connected across terminals $b$, $d$ may be made more nearly linear, and its range of variation increased.

To obtain a more linear resistance across terminals $b$, $d$, the ratio of turns of feedback winding 44 to primary winding 42 and of winding 54 to winding 52 must be carefully chosen. The direct current grid voltage, that is, the voltage at junction 73 relative to the common cathodes 61, is designated as $-E_c$. The direct current grid voltage $E_c$ is the sum of the output voltage of bias supply 65, $E_{cc}$ and the amplifier error voltage $Kf(t)$ across terminals 68. Hence the grid voltage, $e_g$ at grid 66 of triode V1 can be shown from FIG. 4 to be of the form $e_g = -E_c - Fe_p + Ge_0$, where $1_0$ is the voltage across winding 42, $1_p$ is the alternating component of voltage between plate 62 and cathode 61 of triode V1, and F and G are positive constants dependent on the turns ratios of transformers 40 and 50; specifically $$F = \frac{N_{54}}{N_{53}} \text{ and } G = \frac{1}{2}\frac{N_{44}}{N_{42}}$$

where $N_{44}$ is the number of turns of winding 44, etc. Designating the resistance across winding 53 produced by triodes V1 and V2 as R, and likewise designating the reflected resistance across winding 42 produced by resistance 45 as $R_o$, and assuming for convenience that negligible output current between terminals $a$, $d$ is flowing, it is noted from FIG. 4 that $$\frac{2e_p}{R}\left(\frac{N_{53}}{N_{52}}\right) = \frac{e_0}{R_o}$$

Thus, $$e_0 = H\frac{R_o}{R}e_p$$

where $$H = \frac{2N_{53}}{N_{52}}$$

and thus $$e_g = -E_c - Fe_p + GH\frac{R_o}{R}e_p$$

or $$e_g = -E_c - \left[\frac{FR - GHR_o}{R}\right]e_p$$

which simplifies to $$e_g = -E_c - Xe_p$$

or $$e_g = [E_{cc} + Kf(t)] - Xe_p$$

where X is designated as a feedback factor which varies with the direct current grid voltage $E_c$ since the resistance R across winding 53 varies with $E_c$. As the error voltage $Kf(t)$ varies; $E_c$ will vary and thus R will likewise vary. The choice of the constants F, G, and H, and hence of the turns ratios of the windings of transformers 40 and 50 is to be so made that the dynamic resistance R will be nearly linear over as wide a range of the voltage $e_p$ as possible, and will vary in suitable fashion with $E_c$. As $E_c$, and hence R, varies, some value of $E_c$ and R will occur for which $FR - GHR_o = 0$. It is in practice convenient to make this occur at the lowest absolute value, designated as $E_{c1}$, of the working range of $E_c$, which produces the lowest value of R in the range of variation of the latter. This lowest value can be chosen as one at which the dynamic resistance R is quite linear over a wide range of alternating component $e_p$ and is selected for a grid voltage $e_g = e_{g4}$. The minimum value of R, i.e., $R = R_{min}$, can be measured directly from the tube characteristics. At some other convenient value of $E_c$, for example at the maximum absolute value, designated as $E_{c2}$, in the range of $E_c$, the dynamic variation of plate voltage $e_p$ versus plate current $i_p$ is determined graphically from the plate characteristics of triodes V1 and V2 in a fashion essentially identical to that conventionally used for a push-pull amplifier analysis. Since the grid voltage $e_g$ depends on the dynamic variation of plate voltage $e_p$ through the quantity $$X = \frac{FR - GHR_o}{R}$$

which is yet to be determined, one actually determines this dynamic relation for each of several different assumed values of X between zero and, for example, $X_1$, $X_2$ and $X_3$. By plotting the plate voltage $e_p$ versus the plate current $i_p$ as shown in FIG. 6 for various values of the feedback factor X it will be found that some particular value, designated as $X_2$ of X, for example, $X_2 = \frac{1}{5}$, results in a most nearly linear relation between $e_p$ and $i_p$ over the greatest range of $e_p$. Such a relationship defines by its slope a nearly linear resistance, which yields the value $R_{max}$ of R for $E_c = E_{c2}$. Two values of R are thus obtained for X and $E_c$ respectively; namely, at $E_c$ and $E_{c1}$, $R = R_{min}$, and $$X = \frac{FR_{min} - GHR_o}{R_{min}} = 0$$

at $E_c = E_{c2}$, $R = R_{max}$, and $$X = \frac{FR_{max} - GHR_o}{R_{max}} = X_2$$

These two relations can be solved for F and $GHR_o$:

$$F = \frac{X_2 R_{max}}{R_{max} - R_{min}}; \quad GHR_o = \frac{X_2 R_{max} R_{min}}{R_{max} - R_{min}}$$

The bridge will be balanced when $$R = \frac{H^2}{4}R_o$$

A convenient way of choosing $R_o$ is to choose that value which will yield outputs across the output terminals $c$, $d$ of equal amplitude for $R = R_{max}$ and $R = R_{min}$. This requires $$\frac{\frac{4}{H^2}R_{max}}{R_o + \frac{4}{H^2}R_{max}} - 1/2 = 1/2 - \frac{\frac{4}{H^2}R_{min}}{R_o + \frac{4}{H^2}R_{min}}$$

or $$R_o = \frac{4}{H^2}\sqrt{R_{max}R_{min}}$$

which when inserted in the equation for $GHR_o$ results in $$\frac{G}{H} = \frac{X_2\sqrt{R_{max}R_{min}}}{4(R_{max} - R_{min})}$$

Thus far neither G nor H has been found individually but only their ratio. This is a consequence of the fact that since windings 52 and 53 are coupled only inductively to the electrodes of triodes V1 and V2, the impedance level of these windings, and hence in the output of the bridge, can be arbitrarily chosen by an arbitrary choice of H to make the output impedance of the bridge any desired value, depending on the circuit to be connected thereto. Constants F and G are then determined, and thus the required turns ratios of feedback winding 54 to secondary winding 53 and of feedback winding 44 to primary winding 42. It will then be found that the resistance, R, across winding 53 is nearly linear for values of $E_c$ between $E_{c1}$ and $E_{c2}$ over a wide range of $e_g$, as desired. In practice this range of $e_g$ is typically four to five times the range over which acceptable linearity of R is obtained if this feedback means is not used (i.e. if F and G are both zero). The feedback connection thus results in correspondingly greater voltage output from the bridge terminals $c$, $d$.

The grid bias supply voltage, $E_{cc}$, is chosen so that the grid voltage $E_c$, when the amplifier error voltage $Kf(t)=0$, is equal to the middle range of $E_c$, that is, substantially between the minimum $E_{c1}$ and the maximum $E_{c2}$. The result of various values of $E_c$ between its minimum and maximum are plotted on FIG. 5 to show the linearity obtained by the aforementioned feedback means.

Figure 8:
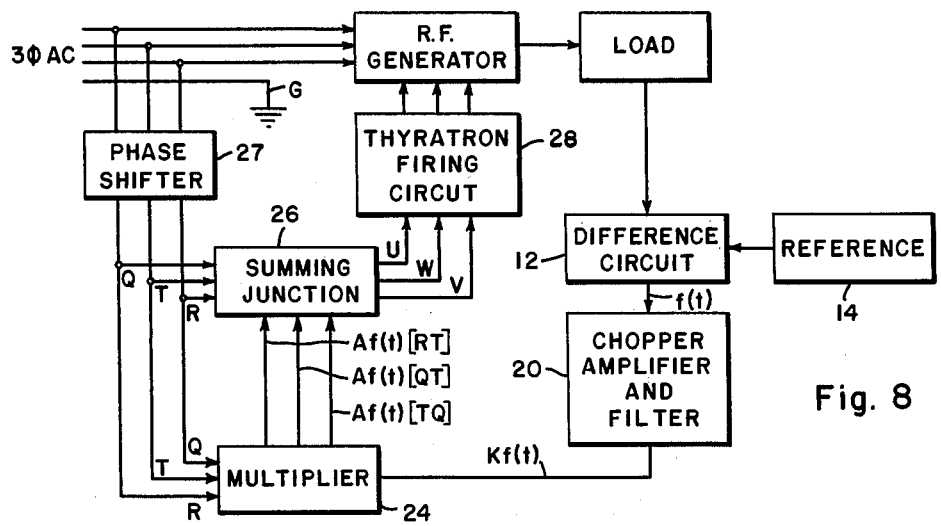
FIG. 8 is a block diagram of a three-phase system embodying the teachings of this invention.

For a three phase system of transformation of alternating current input to direct current output, a set of three such multipliers 22 may be used, each yielding an excitation voltage for controlling the firing of one of the rectifier phases. Such a circuit is as shown in the block diagram of FIGURE 8. The error signal $f(t)$ and its amplification is similar to that shown in the previous figures. The amplified error signal $Kf(t)$ is supplied a three phase multiplier 24 which comprises three single phase multipliers 22 as shown and discussed with regard to FIGURE 4. The resulting three output voltages are then provided to a three phase summing junction 26 which adds thereto the output from a three-phase phase shifter 27 and provides the firing control circuit 28 with the three phase system of excitation voltages shown as U, W and V.

The voltages derived in this manner and used to fire the rectifiers are not absolutely constant in amplitude as $f(t)$ varies but have an amplitude $(B^2+A^2f(t)^2)^{1/2}$, which is always greater than B unless $f(t)$ is zero. The three phase vector diagram of FIGURE 7 shows that the vectorial addition of a quadrature voltage, having a magnitude varying with the error voltage $f(t)$, with the three phase sinusoidal voltages Q, R and T results in a similar three phase system differing in phase from Q, R, T by an amount dependent upon the magnitude $Kf(t)$ and having an amplitude which will be greater as the error signal increases. With the arrangement as shown in FIGURES 4 and 7 the total amount of phase shift range cannot exceed plus or minus 90°.

Figure 9:
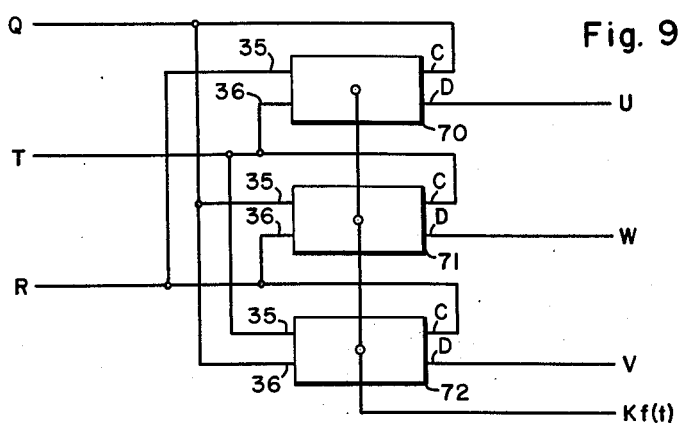
FIG. 9 is a block diagram of a section shown in FIG. 6.

FIGURE 9 shows a circuit connection diagram for the three phase bridge modulator 24 and the summing junction 26 wherein each block 70, 71 and 72 represents a multiplier which produces at its output terminals a fraction $m$ of the voltage at its input terminals. The value of $m$ is controllable by the voltage $Kf(t)$. Each block may contain, for example, the circuit shown in FIGURE 4. The three vectors Q, R and T constitute a balanced three phase alternating voltage source of fixed amplitude and frequency, and the vectors U, V and W will be shown to constitute a similar three phase system differing in phase from Q, R and T by an amount dependent on $m$. The center of the vector triangle QRT has been designated as G and is a reference point such as the ground of the system if such a ground is physically available.

It can be seen by referring to FIGURE 9 that, by connecting voltage RT to the first single phase multiplier 70, there is produced an output voltage $QU=mRT$ which is in phase with the input voltage RT and thus in quadrature with voltage GQ, to which it is added. Similarly, the input terminals 35, 36 of multiplier 71 are connected to Q and R, producing an output voltage $TW=mQR$ in phase with QR and thus in quadrature with GT, to which it is added. Finally, the input to multiplier 72 is TQ, and the output RV is in quadrature with GR. The resultant set of voltages UWV is a balanced 3 phase system shifted in phase from QTR by an amount dependent on the amplitudes of QU, TW, RV and hence on $m$, and therefore ultimately dependent on the amplified error signal $Kf(t)$. There is thereby provided a three phase excitation system for the control of the firing circuits of a three phase rectifier circuit.

Thus, it is readily apparent that the present invention provides an excitation system for controlling the firing of rectifiers which excitation system is completely static, having no friction of any moving device to overcome before correction of the temperature error results. Additionally, correction is made for any error no matter how small the magnitude. In the terminology of controllers, the "dead band" is zero. Since no moving parts need operate to initiate the correction process, the time lag between error and correction is greatly reduced. The present invention affords smooth continuous control, with no steps such as found with controls having wound slidewires, as the sliding contact moves from turn to adjacent turn. The control accuracy of the present invention is thus not limited by the finite resolution of a slidewire. A further advantage is that should error sensing fail, the rectifier output power will simply go to that value obtained when the error signal $f(t)$ is zero. Such a level can, if the process requires it, be preset to a level higher than, lower than, or equal to the operating power level, so that fail-safe operation results.

While the present invention has been described with a particular degree of exactness for purposes of illustration, it is to be understood that all equivalents, alterations, and modifications within the spirit and scope of the invention are herein meant to be included. Although a temperature controller has been described, it is readily apparent that the present invention can be used in any case where it is required to control the output of a grid controlled power transforming system, either alternating current output or direct current output, by using an excitation control system. While a single phase and three phase system has been discussed the present invention can be equally well applied to any polyphase system. The phase shifting scheme might be used to control rotary position of a device which was made sensitive to the phase variation of the output voltage system. Here it would again have the same advantages as described previously.

Although a proportional control system has been described, in which the change in controlled output is determined only by the instantaneous input control signal, this scheme may be readily extended to cases wherein the change in controlled output is determined by derivatives or integrals of the input control signal or combinations thereof.

We claim as our invention:

1. An excitation voltage system for apparatus transforming alternating current input to an electrical output in response to the phase relationship of the excitation voltage with respect to the alternating current input; said excitation system comprising means for providing a constant component of excitation voltage having a preselected phase relationship with said alternating current input for a predetermined electrical output level; sensing means for providing an error signal having a magnitude and polarity functionally related to the difference between the instantaneous magnitude of electrical output and said predetermined electrical output level; means for providing a variable component of excitation voltage substantially in quadrature with said constant component of excitation voltage by amplifying said error signal and modulating therewith a waveform identical to said constant component of excitation voltage; and means for summing said variable and constant component, the resultant excitation voltage having a phase displacement about said preselected phase relationship as determined by said error signal.

2. The excitation voltage system of claim 1 in which said means for providing a variable component of excitation voltage comprises phase shifting means for providing a waveform identical to said constant component of excitation voltage but shifted in phase therewith, multiplier means for amplifying said error signal and modulating said waveform therewith; said chopper amplifier means having as an output said variable component of excitation voltage.

3. An excitation voltage system for apparatus transforming alternating current input to an electrical output in response to the phase relationship of the excitation voltage with respect to the alternating current input; said excitation system providing an excitation voltage having a fundamental component and a variable component of the same frequency as said alternating current input; said excitation system comprising first phase shifting means for providing said fundamental component with a preselected phase angle with respect to said alternating current input for a preselected electrical output level; second phase shifting means for providing a waveform identical to said fundamental component but shifted in phase therewith; sensing means for providing an error signal having a magnitude and polarity functionally related to the difference between the instantaneous magnitude of electrical output and said predetermined electrical output level; means for receiving said waveform and said error signal and providing as an output said variable component substantially 90 degrees out of phase with said fundamental component; and summing means for combining said variable component and said fundamental component to yield a resultant excitation voltage having a phase relationship to said preselected phase angle which relationship varies to an extent determined by the magnitude and polarity of said error signal.

4. An excitation voltage system for apparatus transforming alternating current input to an electrical output in response to the phase relationship of the excitation voltage with respect to the alternating current input; said excitation system providing a resultant excitation voltage having a fundamental component and a variable component; said excitation system comprising first phase shifting means for providing said fundamental component of the waveform $B \sin(\omega t + \delta)$, where $\delta$ is a preselected firing angle with respect to said alternating current input for obtaining a predetermined direct current output level; second phase shifting means for providing a waveform identical to said fundamental component but shifted in phase therewith, namely $\sin(\omega t + \alpha)$; sensing means for providing an error signal, $f(t)$ having a magnitude and polarity functionally related to the difference between the instantaneous magnitude of electrical output and said predetermined electrical output level; means for amplifying said error signal and modulating said waveform therewith to provide said variable component with a form $Af(t) \sin(\omega t + \phi)$ such that $\delta - \phi$ is substantially equal to $\pi/2$ radians; summing means for combining said fundamental component and said variable component with the resultant excitation voltage having a phase relationship which varies about the firing angle $\delta$ to an extent determined by the magnitude of said error voltage $f(t)$.

5. An excitation voltage system for apparatus transforming alternating current input to an electrical output in response to the phase relationship of the excitation voltage with respect to the alternating current input; said excitation system providing a resultant excitation voltage having a fundamental component and a variable component; said excitation system comprising a summing junction having as an output said resultant excitation voltage; first phase shifter means for providing a constant component input to said summing junction for a preselected electrical output level; multiplier means; second phase shifter means for providing a first input to said multiplier means having a phase angle substantially 90 degrees out of phase with said constant component input; sensing means for providing an error signal as a second input to said multiplier means having a magnitude and polarity functionally related to the variance between the instantaneous magnitude of electrical output and said predetermined electrical output level; said multiplier means providing said variable component to said summing junction, said variable component having a magnitude determined by said error voltage; said summing junction providing a resultant excitation voltage which varies in phase relationship to the phase angle of said constant component in a manner functionally related to the magnitude and polarity of said error signal.

References Cited in the file of this patent

UNITED STATES PATENTS

| | | |
|---|---|---|
| 1,927,846 | Rath | Sept. 26, 1933 |
| 2,476,174 | Adler et al. | July 12, 1949 |
| 2,830,256 | Bale | Apr. 8, 1958 |
| 2,915,695 | Zimmerli | Dec. 1, 1959 |